United States Patent [19]
Cerrillo

[11] 4,207,344
[45] Jun. 10, 1980

[54] PROCESSES FOR PROTECTING PROTEIC FOODSTUFFS AGAINST SPOILAGE

[76] Inventor: Vincente P. Cerrillo, Av. Emperadores No. 132, 13 Mexico City, Mexico

[21] Appl. No.: 924,648

[22] Filed: Jul. 14, 1978

Related U.S. Application Data

[63] Continuation-in-part of Ser. No. 785,679, Apr. 7, 1977, abandoned, which is a continuation of Ser. No. 705,102, Jun. 14, 1975, abandoned.

[51] Int. Cl.² ............................ A23B 4/00; A23B 4/14
[52] U.S. Cl. .................................... 426/7; 426/56; 426/332; 426/641; 426/643
[58] Field of Search ................ 426/7, 55, 56, 59, 643, 426/332, 641; 195/28, 29

[56] References Cited
U.S. PATENT DOCUMENTS

| | | | |
|---|---|---|---|
| 2,321,623 | 6/1943 | Ramsbottom et al. | 426/56 |
| 2,934,433 | 4/1960 | Brocklesby et al. | 426/56 X |
| 3,359,115 | 12/1967 | Lanz | 426/643 X |
| 3,533,803 | 10/1970 | Schack et al. | 426/56 |
| 3,561,973 | 2/1971 | Rutman | 426/7 |

*Primary Examiner*—Robert A. Yoncoskie
*Attorney, Agent, or Firm*—Le Blanc, Nolan, Shur & Nies

[57] ABSTRACT

A method for protecting animal derived foodstuffs against spoilage which does not require refrigeration. The foodstuff is immersed in a stabilizer composed of a buffer solution, a proteolytic enzyme, and an antioxidant following which it may be stored at room temperature. The foodstuff can be reconstituted by rapidly reversing its pH by immersion in a hypotonic solution to kill bacteria present in the foodstuffs and then first immersing it in a hypertonic solution to eliminate the hypotonic solution and then rehydrating it. Alternatively, the foodstuff may be utilized, typically as an animal food and in meal form, without reconstituting it.

18 Claims, No Drawings

PROCESSES FOR PROTECTING PROTEIC FOODSTUFFS AGAINST SPOILAGE

This application is a continuation-in-part of application Ser. No. 785,679 filed Apr. 7, 1977, now abandoned. The latter is a continuation of application Ser. No. 705,102 filed June 14, 1975 (now abandoned).

The present invention relates to methods for protecting proteic foodstuffs against spoilage and, more specifically, to novel, improved processes of that character which do not require refrigeration of the foodstuff.

The process has two stages, one denominated the stabilizing stage and the other called the recovery stage. In the first stage the foodstuff—an animal ("animal" is used generically herein to identify mammals, birds, fishes, selachii, crustaceans, etc.) or part thereof—is immersed in a stabilizing liquid composed of an acid or alkaline buffer solution, a proteolytic enzyme which is active in an acid or alkaline medium, depending upon the pH of the stabilizing liquid, and an antioxidant. Thereafter, the product may be stored at room temperature in either closed or open containers.

The second stage is composed of three steps. In the first step, the pH of the foodstuff is adjusted to a preferred level by immersing the product in an acid or alkaline solution. This results in a rapid change of pH from acid to alkaline or vice versa which has been given the name "ionic blow".

In the second step, carried out after the product has been drained, the product is placed in another receptacle which contains a hypertonic solution at a selected pH to dehydrate the cells of the foodstuff, eliminating the hypotonic solution therefrom.

In the third step the product is placed in yet another receptacle which contains a rehydrating solution. Here, the foodstuff recovers ions it may have lost during preceding steps. This results in the foodstuff being restored, as nearly as possible, to its original, fresh or unpreserved form.

BACKGROUND OF THE INVENTION

My novel process may be used to preserve a great variety of proteic foodstuffs. One, commercially important application is the manufacture of fish meal for animal consumption.

Based, for example, on tests involving lamb breeding, the results obtained by feeding fish meal as heretofore prepared were definitely inferior to those expected based on the amount of nitrogen reported by previous tests of fish meal. This was due to the very low digestibility of such meal, to its high content of toxic amines, and to its high bacterial counts.

In reviewing the processes of manufacturing of fish meal heretofore employed, I found that the low digestibility is due to:

1. the fact that the making of the product involves dehydration by application of a direct flame in rotary furnace; or 2. that this is done at a very high temperature in a steam dehydrator (with the further disadvantage that the meal obtained by this process has a highly increased bacterial count); and 3. that meal obtained by the so-called "instant drying process" also suffers a very high thermal treatment which lowers digestibility.

Furthermore, in some heretofore employed processes, the foodstuff is polluted with exhaust gases from internal combustion engines, this being added to the pollutants already in the fish because of the state of decomposition or decay it normally has when it is manufactured into meal.

In an effort to overcome the disadvantages of the foodstuff preservation methods just described, a test was made in Teacapan, State of Sinaloa, Mexico of a modification of the Uruguayan system of fish siloing called "BIOPEZ" which, in turn, is a modification of the Swedish system designed by Virtanen. The tested process involves a bacterial promoted, hydrolysis or fermentation of fish, producing a paste which, while difficult to transport, can be delivered in tank trucks to distribution stations or to the consumer.

More specifically, the fish are ground and then transferred to cement vats. To each 100 kilograms of ground fish is added 20 kilograms of concentrated yeast (Cndomycetaceae subfamilia, Saecharomycetoideae genus, Saccaromyces isolated from the body of sea-bass (Micropogon opercularis)). The ingredients are intimately mixed, and the mixture is agitated three times a day for 6-7 days, after which fermentation is completed. The paste retains its original volume and has a dark brown color with a pleasant odor similar to that of dry figs and a firm consistency. To preserve the preparation for extended periods, 20 kilograms of 50% sulphuric acid are added to each 100 kilograms of paste giving a pH of 4.0-4.5. The paste may be directly fed to the animal without neutralizing it.

While an improvement over the other processes described above, the Mexican (modified Uruguayan) process just discussed is still not satisfactory as far as the quality of the product is concerned.

Another heretofore available technique for preserving protein foodstuffs is the process of "formol sprinkling" used in Peru. However, this only protects the product for a few hours, and it is generally inapplicable. Furthermore, the 37.2% by weight formaldehyde used in the process lowers the digestibility of proteins, increasing costs. Furthermore, formaldehyde acts superficially, not penetrating to the viscera of even small fish such as anchovies; and the amounts which are used are critical.

In short, to obtain adequate protein heretofore required the use of a fresh product; the only practical manner to achieve this to now has been to protect the material against decomposition by refrigeration. This may be done with ice as is done with shrimps and in the U.S. Gulf zone to manufacture fish meal or by using refrigerated brine as is done in Peru. Economically, neither of these two techniques is feasible for foodstuffs intended for consumption by animals.

OBJECTS OF THE INVENTION

It will be apparent to the reader from the foregoing that the primary object of the present invention resides in a novel, improved method of preserving proteic foodstuffs against decomposition.

Another object of the present invention is to provide a process for preserving fishes, crustaceans, mollusks, selachii, birds and mammals which allows them to be maintained at room temperature for long periods without decay.

Another object of the present invention is to provide a process for preserving proteic foodstuffs which minimizes changes in their proteins that would interfere with the digestibility of those constituents.

Still another of the objects of the present invention resides in providing a process for preserving foodstuffs which avoids the oxidation of fats, preventing deterioration and avoiding self-combustion during storage.

Other important objects, features, and advantages of the invention will be apparent to the reader from the preceding, from the appended claims, and from the ensuing detailed description of exemplary, preferred modes of carrying out its precepts.

DETAILED DESCRIPTION OF THE INVENTION

The process of preserving proteic foodstuffs described briefly above has been tested on many species of land and sea animals with good results. In the application of the process to the manufacture of fish meal, the protein was preserved in its initial condition; and bacterial counts were kept at less than 100 bacteria per gram during the whole process. Furthermore, the fats in the product were prevented from becoming rancid.

The meal, as preserved, had a digestibility of 98 percent and favorably passed biological toxicity tests; the amino acid composition was very similar to that of the meal obtained by the reduction and heat-transfer methods described in FOODSTUFFS, Jan. 18, 1969, pp. 44 and 45.

The processing costs were very low, and a study based thereon showed that a good recovery and profit could be obtained by selling the meal at prevailing market prices.

The tests which produced the foregoing results involved a great variety of marine species of all shapes and sizes. They could be preserved without evisceration, and a thick magma that could be readily processed into a meal was obtained.

In the tests carried out to "preserve" fish, the specimens generally maintained their shape.

As discussed above, my novel process for preserving proteic foodstuffs has a stabilization stage followed by a recovery stage.

In the first, stabilization stage, the animal or other proteic material is immersed in a liquid called a "stabilizer". This may be effected at room temperature with complete animals (even with viscera) or with portions of any size.

It is possible to protect the whole animal or just a part thereof; e.g., the meat, blood, viscera, etc. The time for which the foodstuff is immersed will vary according to the size of the animal, the nature of its skin, the temperature at which the process is carried out, the concentration in which the "stabilizing" liquid or "stabilizer" is used, etc.

After this first stage, the product can be handled and stored at room temperature. It is convenient to do so in bags (of polyethylene, for example) or in boxes or other packages which can be closed or sealed to avoid the dehydration of their contents. However, it is also possible to handle the product in bulk or in unsealed bags. In this case the product undergoes dessication but does not decay.

The second, revovery stage is also effected by immersion in liquid, in this case in three steps.

In the first step, the "protecting" or preservative effect of the stabilizing liquid is eliminated, and microorganisms present in the foodstuff are killed. In the second step, the product is washed; and, in the third step, the product is returned as nearly as possible to its initial condition; i.e., to the condition it enjoyed prior to immersion in the stabilizing liquid.

The first stage of this system is very simple. It only requires a vessel for the stabilizing liquid. The shape and size of the vessel may vary, but it is necessary that the product be totally immersed in the liquid for the entire time necessary to insure its protection. The stabilizing stage is preferably effected at a site where the foodstuff can be protected against the sun, dust, insects, and animals.

At the end of this first stage of the process, the product may stored at room temperature as indicated above. It is only necessary to allow for the outflow of excess liquid which will slowly come off of the product during storage.

If the product is to be handled in bulk or packaging which is not waterproof; it is preferably to accelerate this exudation of liquid so that the product can be transported in a dry dehydrated condition.

In the first, stabilizing stage of my process, use is made of the hydrogen ion to protect the proteins in the foodstuff being treated, advantage being taken of the inhibiting effect of such ions on enzymatic mechanisms which cause autolysis of cells. The hydrogen ions furnished by the donor also create a bacteriostatic and fungistatic environment, thus preventing microorganisms present in the foodstuff from attacking the proteic constituents thereof.

The component furnishing the hydrogen ions may be a potable organic acid such as acetic, citric, or lactic or an inorganic acid, preferably potable, such as hydrochloric or phosphoric. In any case the acid should be free of pollutants.

An enzyme is employed to break down the proteic intercellular cement between the cells of the material being treated especially those of the epithelal tissues. This permits the hydrogen ion furnishing component to penetrate rapidly into the material being treated.

The enzymes employed for my purposes are proteolytic; they may be of animal or vegetal origin, or they can be produced by different strains of bacterias or molds (fungi). Enzymes that I have successfully used are pepsin, papain, and bromelain.

The amount employed varies according to the activity of the enzyme. To guard against autolysis of the foodstuff cells, however, I employ the selected enzyme in a concentration which is approximately one tenth of that which would result in proteolytic activity. While the enzyme concentrations I employ thus do not result in breakdown of the cells, they are nevertheless capable of effecting the wanted dissolution of the intercellular cement.

Enzymatic action is insured by using a buffer to adjust the pH of the stabilizing liquid to a level $\leq 5$ which is optinum for the particular enzyme being used. As a buffer I employ the same acid employed as the hydrogen ion donor or a salt of that acid.

Besides protecting the protein of the foodstuff being preserved, it is also necessary to inhibit decomposition of its fatty contituents. This is achieved in situ by adding a potable antioxidant to the stabilizing liquid. The amount of antioxidant is correlated to the amount of fat in the product so that the amount of antioxidant will not exceed the limits allowed for the use to which the product will be put.

Other processes for preserving foodstuffs which employ acidic materials are of course known. One example of such a process is pickling. A proteic product pickled with an organic acid at a pH lower than 4.5 may be preserved for long periods.

Another food preservation process employing an acid was developed by A. I. Virtamen for preserving green feed. This process, which involves the acidification of the product by one or more strong organic acids was used in Sweden in 1936 to preserve fish in an "ensiloed" condition at a pH of 2.

Another prior art process of the type in question was developed by Edin in Denmark in 1940 for making fish paste. In this process molasses, a yeast culture, and sulphuric acid are added to the raw material. This process works at a pH from 4 to 4.5.

Finally, Olsson (1940), Hanson and Lavern (1951), Petersen (1951), and Carl (1952) described a food preservation process in which use is made of mixtures of sulphuric acid plus hydrochloric acid, free sulphuric acid (i.e., free of arsenic), formic acid, sulphuric acid plus formic acid, and lactic acid plus molasses and a bacterial culture.

In all of the foregoing processes, the material being preserved must be milled, minced, shredded, or otherwise comminuted. This step with its cost, perhaps unwanted changes in the physical characteristics of the foodstuff, and other disadvantages are eliminated by my process.

The concept of treating proteic foodstuffs with a proteolytic enzyme is of course also not per se claimed to be novel. However, no one has herefore employed an enzyme in a food preservation process or, more particularly, to break down intercellular cement so that an acidic or alkaline material can penetrate through the foodstuff and create an environment which inhibits reactions that would cause decay of the foodstuff.

For example, Ramsbottom et al U.S. Pat. No. 2,321,623 and Schack et al U.S. Pat. No. 3,533,803, both cited in parent application Ser. No. 785,679, are not concerned with preserving proteic foodstuffs but with tenderizing "the flesh of edible animal carcasses" by using enzymes. The Rutman (U.S. Pat. No. 3,561,973) and Brocklesby (U.S. Pat. No. 2,934,433) patents cited in that application are equally remote. The first is concerned with a method for digesting a mixture of pulped fish and fat, the second with a high temperature process for peptizing insoluble proteins.

As mentioned above, the product being preserved is immersed seriatim in three different liquids in the second, recovery stage of the process. The objective of the first step is to rapidly change the pH of the product. This, which is done by immersing the product in an alkaline solution and which I term the "ionic blow", produces a beneficial bactericidal and fungicidal effect.

The pH adjustment is facilitated by two characteristics of the stabilized product. First, the opening of the intercellular spaces allows the recovery liquid to penetrate to the interior of the product, insuring a rapid and adequate concentration of the hydroxyl ion in all cells of the product.

Second, the cells are dehydrated when they are submitted to the stabilizing solution as the latter is hypertonic. This dehydrated condition speeds penetration of the hydroxyl ions into the cells as the first recovery solution is hypotonic.

The bactericidal effect is obtained because most bacterial strains commonly found on the skin and mucous membrane of animals and in the contents of the intestinal tract are active only at a pH which is neutral, slightly acid, or slightly alkaline. When they are subjected to a sudden and large change in pH, first toward acidity and then toward alkalinity, or vice versa; i.e., to an ionic blow, they do not survive.

The same is true of fungi found in the environments just described.

The hypotonic alkaline solution employed to deliver the ionic blow is prepared by dissolving a potable base in water in an amount sufficient to produce a pH $\geq 9$. Suitable bases include sodium, potassium, and calcium hydroxides and mixtures of the foregoing.

This and the subsequent steps of the recovery stage should be performed under sterile conditions. Once the protective effect of the stabilizing liquid has been taken away by immersing the product in the alkaline solution, the product becomes highly susceptible to pollution by bacteria or fungi. If one carries out the second stage steps under strict aseptic conditions, the final product may be kept at room temperature in hermetically sealed, sterilized packages. If the conditions are not sufficiently aseptic, it is necessary to refrigerate the reconstituted product to avoid decay.

The previously mentioned second step of the recovery stage involves the immersion of the foodstuff in a hypertonic solution having a pH of 5 to 7 in order to adjust the pH of the foodstuff to the desired level. Because of the previous breakdown of the intercellular cement this step also proceeds rapidly and efficiently. In addition, because of the lower osmotic pressure of the solution used to produce the ionic blow in the preceding step, that solution is efficiently expelled from the foodstuff cells by the hypertonic solution used in the second step.

The hypertonic solution can be prepared by dissolving any of a wide variety of potable salts evident to the average chemist in water. Sodium chloride will typically be employed because of its low cost and widespread availability.

In the first and second steps of the recovery stage the ionic concentration in the foodstuff is altered by the osmotic pressure-induced passage of ions through the semi-permeable walls of the foodstuff cells. The electrolytic balance is restored and the fluid content of the foodstuff adjusted to the wanted level in the third step of the recovery stage, again by immersing the foodstuff in an appropriate solution.

The composition of the rehydrating solution employed in the third step will depend upon, and can readily be determined for, the particular foodstuff involved. One exemplary composition is defined hereinafter.

Preferred modes of carrying out my novel process are described in the examples wich follow.

EXAMPLE 1

To stabilize 100 kg. of sardine with an approximate content of 14 percent of fat, the following constituents were employed.

hydrochloric acid (30 percent), free of contaminants: 10 liters
potassium chloride: 7.9 grams
purified pepsin 1/10,000 (Difco): 1 gram
Ionol 2,6-di-tert-butyl 4-methyl phenol antioxidant (Shell): 1 gram
drinking water: 88 liters A buffer solution (Solution A) was prepared by adding the potassium chloride dissolved in one liter of water to 88 liters of water. Thereafter the hydrochloric acid was added with continual stirring (a long stem funnel or a hose is used to add the acid under the surface and avoid the generation of toxic vapors).

The pepsin was dissolved in 400 ml of water, and the Ionol was added. This solution, called "Solution B", was mixed with Solution A; and the mixture was briefly homogenized before immersing the sardines in it to stabilize them.

The stabilized sardines were placed in perforated plastic boxes or nets to facilitate handling and immersed (in a tank) in a hypotonic solution made by diluting 14 liters of a 10 N sodium hydroxide solution (NaOh 10/N) in 86 liters of drinking water. The liquid was agitated to accelerate the alkalinization process.

The sardines were removed from the hypotonic solution, and excess fluid was allowed to drain off. Then the sardines were placed in another washing tank containing a hypertonic solution of sodium chloride to dehydrate the cells, thus accelerating the outflow of the hydroxyl ions. This solution was prepared by dissolving 12 grams of sodium chloride per liter in a large quantity of water.

The product was introduced into a third tank containing a rehydrating solution from which the product recovered ions lost in the previous steps. This solution contained:

| Ion | Grams/liter of water |
|---|---|
| $Na^+$ | 3220 |
| $K^+$ | 390 |
| $Ca^{++}$ | 100.2 |
| $Mg^{++}$ | 36.5 |
| $Cl^-$ | 3660 |
| Perfect Osmolarity | 306 m mol/liter |

EXAMPLE 2

100 kilograms of anchovies were stabilized using the procedure of Example 1 except that sea water was used instead of drinking water. The anchovies were then converted to a meal.

EXAMPLE 3

100 kilograms of shrimp were treated as described in Example 1. Both the stabilizing and recovery stages were employed.

The products identified in Examples 2 and 3 were tested for proteic efficiency and subchronic toxicity and subjected to microbiological and proximate analyses.

Proteic efficiency was evaluated using the protocol for measuring protein efficiency ratio (PER) promulgated by the assessor's group for proteins of the FAO (Food and Agricultural Organization, an agency of the United Nations).

The growth of animals used for testing the shrimp was superior to the growth of animals fed with the protein of reference (casein) by a ratio of 1.91:1.

The PER value obtained for casein was 2.51, and for the protein of the shrimps it was 2.78. This demonstrated the efficiency of the protein studied.

Sub-chronic toxicity tests were made on groups of 10 male rats and 10 females rats at two ingestion levels of the test product (shrimp of Example 3). The test period lasted 90 days. Besides recording and analyzing food ingestion and growth, hemoglobin behavior was investigated; and biochemical data were obtained for blood and urine during the last week of the test. The study was completed by macroscopically examining all the animals via post mortem examination. From eight to ten organs were weighed. Tissue samples (20 to 30) were incorporated in paraffin and examined microscopically. The microscopical examination was restricted to the samples obtained from the animals that were fed with the larger quantities of the test products.

Pathological examinations of organs such as the spleen, suprarenal gland and others showed them to be normal. The studies of haematic citology and blood chemistry gave values which are within normal limits.

In short, the shrimps processed as described in Example 3 were found to be non-toxic and usable for human consumption.

The results of the microbiological analyses of products described in Examples 2 and 3 were as follows:

TABLE I

Microbiological Analysis of Fresh Anchovy (Control) and Anchovy Meals Treated by Different Methods of Preservation

| | LOT | | |
|---|---|---|---|
| | Control | Commercial Process | Product of Example 2 |
| Total count of colonies/g | 12,900 | 230 | not present |
| Coliform NMP/g | 4 | not present | not present |
| Fungi count, colonies/g | 30 | not present | not present |

NMP: Most probable number of colonies per gram
Commercial Process: Peruvian method (formaldehyde and sodium nitrite, see prior discussion "Background etc."

TABLE 2

Maximum Values in The Microbiological Control of Shrimps Preserved With The Preservation System of Enzymatic Inhibition

| | Control | Shrimp of Example 3 |
|---|---|---|
| Standard count of mesophillic organisms - colonies/ml | 2,200 | 0 |
| Standard count of coliform organisms - NMP/ml | 15 | 0 |
| Enterococcoes - colonies/ml | 0 | 0 |
| Molds (Fungi) and yeasts colonies/ml | 0 | 0 |

Control: Shrimps frozen in natural state with heads conserved

The following table contains data gathered from proximate analyses of anchovy meal prepared as described in Example 2, anchovies treated with a commercial additive and converted into meal, and a control.

TABLE 3

Proximate Analyses of Fresh Anchovy (Control) and Anchovy Meal Treated by Different Process

| | | LOT | | |
|---|---|---|---|---|
| | | Control | Commercial Process | Process of Example 2 |
| Moisture | | 72.8 | 22.6 | 29.1 |
| Proteins | BH | 18.3 | 51.0 | 46.1 |
| (N × 6.25) | BS | 67.3 | 65.9 | 65.0 |
| Etherous | BH | 5.4 | 15.7 | 16.9 |
| Extract | BS | 19.9 | 20.3 | 23.8 |
| Ash | BH | 3.4 | 10.2 | 4.5 |
| | BS | 12.5 | 13.2 | 6.4 |
| Non nitro- | BH | 0.1 | 0.5 | 3.4 |
| genized extract | BS | 0.3 | 0.6 | 4.8 |

BH: Wet base
BS: Dry base
Commercial Process: same as identified in Table 1

To this point, my process for preserving proteic foods has been described primarily with reference to the use of an acidic buffering solution and hydrogen ions to protect the cells of the animal and inhibit activity of the accompanying microorganisms. However, as indicated above, the hydroxyl ion may also be employed for the same purpose. In that case I use a proteolytic enzyme which is active in an alkaline environment (pH≧9) and an alkaline buffer solution which is adjusted to the optimal pH for the selected enzyme. The remainder of the stabilizing stage remains the same.

Various materials may be employed to prepared alkaline buffers of the desired pH and to furnish the hydroxyl ions. These include sodium, potassium, and calcium hydroxides and combinations of those compounds.

In the second, recovery stage only the first step is changed and that only to the extent that an acid, rather than alkaline, hypotonic solution is used to produce the ionic blow. Those compounds which are used in the acidic buffer solutions can equally well be employed in the acidic hypotonic solutions.

With the exceptions identified above, the process using an alkaline buffer solution can be carried out essentially as described in Example 1.

The stabilization stage of my process can also be applied to whole animals to produce natural teaching models. These, among other advantages, do not have to be refrigerated. Also, the consistencies of the tissues remain similar to those of the unpreserved animal, and the preserved animals are not dangerous to handle.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed and desired to be secured by Letters Patent is:

1. A process for preserving and then restoring to a usable state a foodstuff which is an animal or animal part containing protein and animal fat formed in vivo, said process comprising the steps of: immersing said foodstuff in a stabilizing liquid comprising a proteolytic enzyme in an amount effective to hydrolyze the intercellular substances of said foodstuff without enzymolysis of the foodstuff cells, a buffer for adjusting the stabilizing liquid to a pH of $\leq 5$ or $\geq 9$ at which the enzyme is viable and autolysis of the foodstuff cells is inhibited, and an effective amount of edible antioxidant for retarding oxidation of fatty constituents of the foodstuff, said foodstuff being immersed in said stabilizing liquid for a time sufficient to effect the hydrolysis of said intercellular structures; and restoring said foodstuff to a usable stage by sequentially: rapidly reversing the pH of the foodstuff in a hypotonic solution to destroy microorganisms present in said foodstuff; immersing the foodstuff in a hypertonic solution having a pH in the range of 5 to 7 to dehydrate the foodstuff cells and thereby eliminate the hypotonic solution from the foodstuff; and rehydrating the foodstuff and replacing ions lost during prior processing steps by immersing the foodstuff in an isotonic solution to thereby restore said foodstuff to a condition approaching that existing prior to the immersion of the foodstuff in the stabilizing liquid, all of the aforesaid steps being carried out at a not higher than ambient temperature.

2. A process as defined in claim 1 which employs a hypotonic solution having a pH $\leq 5$ if the stabilizing liquid is basic and a hypotonic solution having a pH of $\geq 9$ if the stabilizing liquid is acidic.

3. A process as defined in claim 1 wherein the foodstuff is stored at ambient temperature following the immersion of the foodstuff in the stabilizing liquid.

4. A process as defined in claim 3 wherein the foodstuff immersed in the stabilizing liquid is recovered therefrom and then stored in a sealed container.

5. A process as defined in claim 1 wherein the steps subsequent to the reversal of the pH of the cellular material are carried out under aseptic conditions.

6. A process as defined in claim 5 together with the step of storing the restored foodstuff under sterile conditions at ambient temperatures.

7. A process as defined in claim 5 together with the step of storing the restored foodstuff under refrigeration.

8. A process as defined in claim 1 in which the concentration of enzyme in the stabilizing liquid is on the order of one-tenth of the concentration which would result in proteolytic activity against the cells of the foodstuff being preserved.

9. A process as defined in claim 1 which also includes the step of converting the foodstuff to a meal after it has been restored to a usable state.

10. A process as defined in claim 1 in which the foodstuff is a fish or a part thereof.

11. A process for producing a stabilized foodstuff which is an animal or animal part containing protein and animal fat formed in vivo and which is protected against spoilage, said process comprising the step of: immersing said foodstuff in a stabilizing liquid comprising a proteolytic enzyme in an amount effective to hydrolyze the intercellular substances of said foodstuff without enzymolysis of the foodstuff cells and thereby facilitate access to the interior of the foodstuff, a source of hydrogen ions in an amount sufficient to prevent microorganisms present in said foodstuff from attacking the proteic constituents thereof, a buffer for adjusting the stabilizing liquid to a pH of $\leq 5$ at which the enzyme is viable and autolysis of the foodstuff cells is inhibited, and an effective amount of edible antioxidant for retarding oxidation of fatty constituents of the foodstuff, said foodstuff being immersed in said stabilizing liquid for a time sufficient to effect the hydrolysis of said intercellular structures and the penetration of said hydrogen ions and said antioxidant into the interior of the foodstuff.

12. A process as defined in claim 11 wherein the foodstuff is stored at ambient temperature following the immersion of the foodstuff in the stabilizing liquid.

13. A process as defined in claim 12 wherein the foodstuff immersed in the stabilizing liquid is recovered and stored in a sealed container.

14. A process as defined in claim 11 which includes the step of effecting the removal of liquid from the foodstuff after it is removed from the stabilizing liquid to facilitate the handling and storage of the stabilized foodstuff.

15. A process for producing a stabilized foodstuff which is an animal or animal part containing protein and animal fat formed in vivo and which is protected against spoilage, said process comprising the step of: immersing said foodstuffs in a stabilizing liquid comprising a proteolytic enzyme in an amount effective to hydrolyze the intercellular substances of said foodstuff without enzymolysis of the foodstuff cells and thereby facilitate access to the interior of the foodstuff, a source of hydroxyl ions in an amount sufficient to prevent microorganisms present in said foodstuff from attacking the proteic constituents thereof, a buffer for adjusting the stabilizing liquid to a pH of $\geqq 9$ at which the enzyme is viable and autolysis of the foodstuff cells is inhibited, and an effective amount of edible antioxidant for retarding oxidation of fatty constituents of the foodstuff, said foodstuff being immersed in said stabilizing liquid for a time sufficient to effect the hydrolysis of said intercellular structures and the penetration of said hydroxyl ions and said antioxidant into the interior of said foodstuff.

16. A process as defined in claim 15 wherein the foodstuff is stored at ambient temperature following the immersion of the foodstuff in the stabilizing liquid.

17. A process as defined in claim 15 wherein the foodstuff immersed in the stabilizing liquid is recovered and stored in a sealed container.

18. A process as defined in claim 15 which includes the step of effecting the removal of liquid from the foodstuff after it is removed from the stabilizing liquid to facilitate the handling and storage of the stabilized foodstuff.

* * * * *

UNITED STATES PATENT AND TRADEMARK OFFICE
CERTIFICATE OF CORRECTION

PATENT NO. : 4,207,344
DATED : June 10, 1980
INVENTOR(S) : Vincente Parrilla Cerrillo It is certified that error appears in the above-identified patent and that said Letters Patent are hereby corrected as shown below:

Column 3, line 62, "revovery" should be --recovery--.

Column 4, line 55, "optinum" should be --optimum--.

Column 4, line 60, "contituents" should be --constituents--.

Column 6, line 52, "wich" should be --which--.

Signed and Sealed this

Twenty-first Day of April 1981

[SEAL]

Attest:

RENE D. TEGTMEYER

*Attesting Officer*     *Acting Commissioner of Patents and Trademarks*